United States Patent
Tanaka et al.

(10) Patent No.: US 11,260,761 B2
(45) Date of Patent: Mar. 1, 2022

(54) FUEL CELL VEHICLE

(71) Applicant: NISSAN MOTOR CO., LTD., Yokohama (JP)

(72) Inventors: Koichi Tanaka, Kanagawa (JP); Tetsuo Uozumi, Kanagawa (JP); Tomoyuki Hanada, Kanagawa (JP); Shinichi Akiba, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 16/638,524

(22) PCT Filed: Aug. 14, 2017

(86) PCT No.: PCT/JP2017/029317
§ 371 (c)(1),
(2) Date: Feb. 12, 2020

(87) PCT Pub. No.: WO2019/035170
PCT Pub. Date: Feb. 21, 2019

(65) Prior Publication Data
US 2020/0369166 A1 Nov. 26, 2020

(51) Int. Cl.
*B60K 1/04* (2019.01)
*H01M 8/04* (2016.01)
(Continued)

(52) U.S. Cl.
CPC .............. *B60L 50/75* (2019.02); *B60K 1/04* (2013.01); *H01M 8/04201* (2013.01);
(Continued)

(58) Field of Classification Search
CPC .......... B60L 50/75; B60L 50/72; B60L 50/71; B60L 50/70; B60K 1/04;
(Continued)

(56) References Cited

U.S. PATENT DOCUMENTS

| 5,780,980 A | 7/1998 | Naito |
| 6,849,017 B2 * | 2/2005 | Nett ...................... B60K 6/405 475/5 |

(Continued)

FOREIGN PATENT DOCUMENTS

| CN | 103068611 A | 4/2013 |
| JP | H08-289410 A | 11/1996 |

(Continued)

OTHER PUBLICATIONS

Plugpower: "GenDrive Series 1000 Fuel Cell Power for Today's Material Handling Equipment", Dec. 2014, pp. 1-2, Retrieved from the Internet: URL:https://www.plugpower.com/wp-content/uploads/2014/12/GenDrive-Series-1000-Spec-Sheet.pdf. [retrieved on Jan. 6, 2022].

(Continued)

*Primary Examiner* — John D Walters
(74) *Attorney, Agent, or Firm* — Foley & Lardner LLP

(57) ABSTRACT

In the fuel cell vehicle provided with the motor and configured to drive the motor with power of at least one of the fuel cell 1 and the battery, the fuel cell having a DC voltage of less than 60 V is disposed in the rear portion of the vehicle and the battery is disposed in the front relative to the fuel cell.

4 Claims, 5 Drawing Sheets

(51) Int. Cl.
  *B60L 50/75* (2019.01)
  *H01M 8/04082* (2016.01)
  *H01M 8/04858* (2016.01)
  *H01M 16/00* (2006.01)

(52) U.S. Cl.
  CPC ..... *H01M 8/04873* (2013.01); *H01M 16/006* (2013.01); *B60K 2001/0438* (2013.01); *H01M 2250/20* (2013.01)

(58) Field of Classification Search
  CPC ...... B60K 2001/0438; H01M 8/04201; H01M 8/04873; H01M 16/006; H01M 16/003; H01M 16/00; H01M 2250/20
  USPC ....................................................... 180/65.1
  See application file for complete search history.

(56) References Cited

U.S. PATENT DOCUMENTS

| | | | |
|---|---|---|---|
| 7,083,016 B2 | 8/2006 | Chernoff et al. | |
| 7,363,949 B2 | 4/2008 | Kubo et al. | |
| 8,228,690 B2* | 7/2012 | Watanabe | H02J 1/10 363/16 |
| 9,799,901 B2* | 10/2017 | Yamanaka | H01M 8/04089 |
| 10,246,087 B2* | 4/2019 | Mitchell | B60W 50/0098 |
| 2004/0149500 A1* | 8/2004 | Chernoff | B62D 21/07 180/65.1 |
| 2006/0003218 A1* | 1/2006 | Shiomi | H01M 8/0662 429/408 |
| 2006/0289213 A1* | 12/2006 | Cervantes | B60L 3/0046 340/438 |
| 2013/0168167 A1 | 7/2013 | Matsumoto | |
| 2015/0188160 A1* | 7/2015 | Lee | H01M 8/0488 429/432 |
| 2015/0210185 A1* | 7/2015 | Ge | B60L 58/40 307/9.1 |
| 2018/0375127 A1 | 12/2018 | Yamazaki et al. | |
| 2019/0229542 A1* | 7/2019 | Dunn | H02J 7/34 |

FOREIGN PATENT DOCUMENTS

| | | |
|---|---|---|
| JP | 2000-164234 | 6/2000 |
| JP | 2001-339872 | 12/2001 |
| JP | 2006-73298 A | 3/2006 |
| JP | 2007-214072 | 8/2007 |
| JP | 2008-103158 A | 5/2008 |
| JP | 2009-292190 A | 12/2009 |
| JP | 2010-103066 A | 5/2010 |
| JP | 2011-143871 A | 7/2011 |
| JP | 2012-074293 | 4/2012 |
| JP | 2012-086714 | 5/2012 |
| JP | 2013-252797 A | 12/2013 |
| JP | 2017-4812 A | 1/2017 |
| WO | WO-2017/110513 A1 | 6/2017 |

OTHER PUBLICATIONS

The David James Agency NY: "Plug Power Announces Industry's Highest Capacity Fuel Cell for Material Handling Applications", Jun. 24, 2013, pp. 1-3, XP55876667, retrieved from the Internet: URL:https://s21.q4cdn.com/824959975.files/doc_news/Plug-Power-Announces-Industrys-Highest-Capacity-Fuel-Cell-for-Material-Handling-Application.pdf [retrieved on Jan. 6, 2022].

* cited by examiner (a)

(b)

FUEL CELL VEHICLE

TECHNICAL FIELD

The present invention relates to a fuel cell vehicle.

BACKGROUND ART

In an electric vehicle using a motor as a driving source, a range extender hybrid vehicle mounted with an engine for power generation and a fuel tank for engine is known. For example, JP2011-143871A discloses a vehicle structure in which an engine and a fuel tank are mounted in a lower portion of a rear seat arrangement portion.

SUMMARY OF INVENTION

Meanwhile, also in a range extender fuel cell vehicle using a motor as a driving source and mounted with a fuel cell for power generation, the mounting position of the fuel cell for power generation needs to be examined. However, when the fuel cell is mounted in a lower portion of a rear seat arrangement portion as with the electric vehicle described above, it is necessary to raise the floor surface of the lower portion of the rear seat arrangement portion in order to secure a space where the fuel cell is mounted. This poses a problem that the seating position of the rear seat rises, so that an occupant space is narrowed.

Moreover, when examining the mounting position of the fuel cell, not only the securement of the occupant space but electric safety needs to be considered.

It is an object of the present invention to provide a fuel cell vehicle securing the electric safety and not narrowing the occupant space.

According to an embodiment of present invention, in the fuel cell vehicle provided with the motor and configured to drive the motor with power of at least one of the fuel cell 1 and the battery, the fuel cell having a DC voltage of less than 60 V is disposed in the rear portion of the vehicle and the battery is disposed in the front relative to the fuel cell.

The following describes the embodiments of the present invention in detail with accompanying drawings.

DESCRIPTION OF EMBODIMENTS

Hereinafter, embodiments of the present invention are described with reference to the accompanying drawings.

First Embodiment

Figure 1:
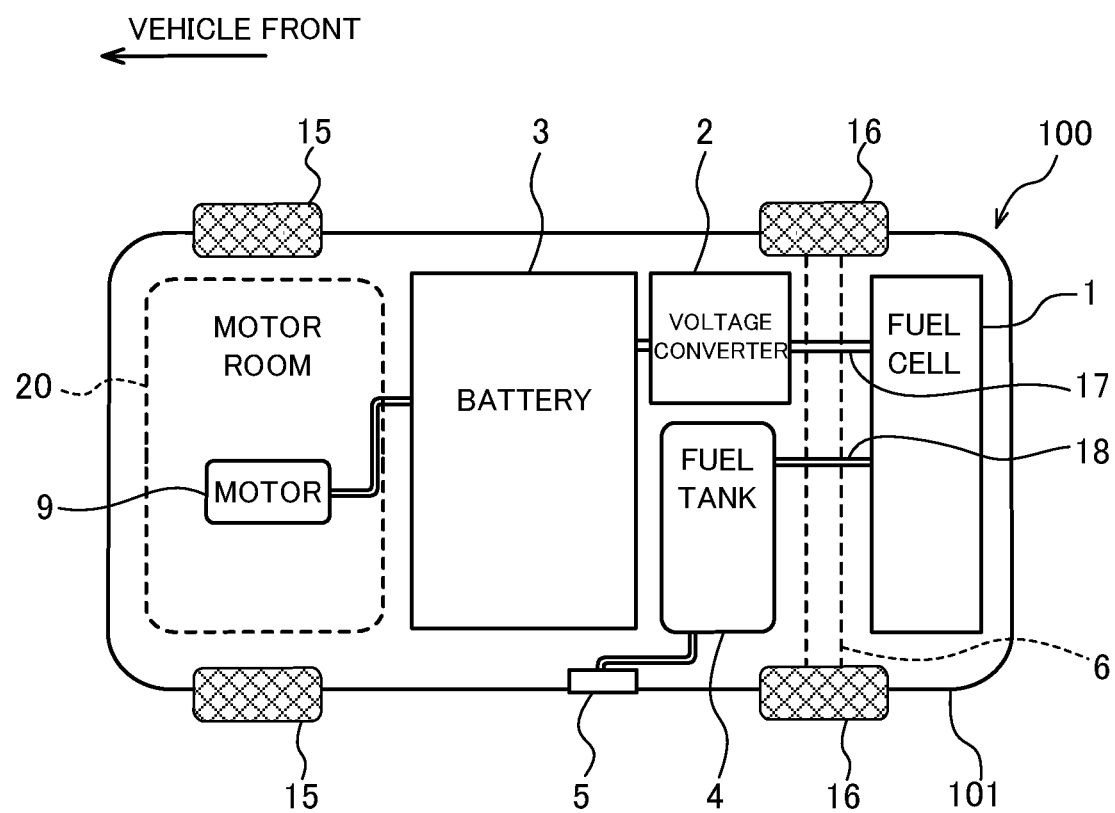
FIG. 1 is a schematic view in which a fuel cell vehicle of a first embodiment is viewed from the lower side of a car body.

FIG. 1 is a schematic block diagram for explaining the layout (car body structure) of each configuration in an electric vehicle 100 provided with a fuel cell (hereinafter simply referred to as a fuel cell vehicle 100). The figure illustrates a figure in which the fuel cell vehicle 100 of the first embodiment is viewed from the lower side of the car body.

As illustrated in FIG. 1, the fuel cell vehicle 100 is configured so that at least a fuel cell 1, a voltage converter 2, a battery 3, a fuel tank 4, an oil filling port 5, front wheels 15, rear wheels 16, a rear axle 6, and a motor room 20 in which a motor 9 as a driving source is disposed are provided in a car body 101 in which the forward and backward direction of the vehicle is the longitudinal direction.

The voltage converter 2 is a voltage converter electrically interposed between the fuel cell 1 and the battery 3 and configured to convert a DC voltage output from the fuel cell 1. The voltage converter 2 is configured by a DC/DC converter configured to boost or step-down a voltage of an input voltage, and then output the same, for example.

The battery 3 is charged with power generated by the fuel cell 1 through the voltage converter 2. The battery 3 is a power source configured to supply power to the motor 9 disposed in the motor room 20. For example, the battery 3 outputs power by a DC voltage of several hundred volts (V). The battery 3 is realized by secondary batteries, such as a lithium ion battery and a lead battery, capacitors, and the like. The battery 3 is configured so that power accumulation equipment, such as the secondary batteries and the capacitors, is housed in a case.

The fuel tank 4 is connected to the oil filling port 5 configured to inject fuel from the outside of the vehicle through fuel piping and stores fuel required for the power generation by the fuel cell 1. When the fuel cell 1 is realized by a solid oxide fuel cell (SOFC), the stored fuel is alcohol (for example, ethanol). When the fuel cell 1 is realized by a polymer electrolyte fuel cell (PEFC), the stored fuel is an anode gas (hydrogen gas) maintained in a high pressure state.

The motor room 20 is a portion which is provided in a front portion of the vehicle and in which the motor 9 is disposed. Although not illustrated, equipment, such as a DC/DC converter configured to adjust a DC voltage from the battery 3 and an inverter configured to supply an alternating current to the motor 9 according to the DC voltage from the DC/DC converter, is disposed in the motor room 20 besides the motor 9.

The front wheels 15 and the rear wheels 16 are wheels arranged in the forward and backward direction of the car body 101.

The rear axle 6 is formed so as to extend in the width direction of the vehicle and rotatably supports the rear wheels 16.

The fuel cell 1 is a power supply capable of supplying power to at least one of the battery 3 and the motor 9. The fuel cell 1 generates power by receiving the supply of a fuel gas (anode gas) and an oxidizer gas (cathode gas). The fuel cell 1 is realized by the SOFC or the PEFC. In FIG. 1, attached equipment (FC auxiliary machines) required for the power generation of the fuel cell 1, e.g., a supply device configured to supply the fuel gas or the oxidizer gas to the fuel cell 1 and the like, is omitted.

The fuel cell 1 is also referred to as a fuel cell stack or a cell stack and is configured by laminating a plurality of cells configured by an electrolyte material, two electrodes (anode electrode, cathode electrode), and a separator. For example, when the fuel cell 1 is realized by the SOFC, the electrolyte material is stabilized zirconia and, when the fuel cell 1 is realized by the PEFC, the electrolyte material is an ionexchange membrane. The magnitude of the DC voltage which can be output by the fuel cell 1 configured as described above can be set according to the number of laminations (number of stacks) of the cells.

As illustrated in the figure, the fuel cell 1 is disposed in a rear portion of the vehicle. However, when a high voltage component is disposed in the rear portion of the vehicle, it is necessary to take safety measures considering the collision safety against impact caused by collision, particularly impact caused by bump from the rear of the vehicle. Specifically, it is necessary to eliminate danger that the high voltage component is exposed due to a damage of a housing covering the fuel cell 1 in collision, for example, so that a person directly contacts the same (electric shock). In order to eliminate the danger, structural protective measures for preventing the high voltage component from being exposed in collision, for example, are required. However, when such protective measures are taken, an increase in cost or an extension of a space for carrying the fuel cell 1 is caused.

Therefore, an output voltage of the fuel cell 1 to which the present invention is applied is set to be less than the predetermined voltage (low voltage) experimentally, theoretically, or legally set from the viewpoint whether influence on a human body is permissible even when a person directly contacts the same. By setting the output voltage of the fuel cell 1 as described above, the fuel cell 1 can be disposed in the rear portion of the vehicle without taking the safety measures described above.

In this embodiment, the predetermined voltage is set to 60 V. In this specification, as the output voltage of the fuel cell 1 such that, even when a person directly contacts the same, influence on a human body is substantially negligible, a voltage such that the upper limit voltage of the DC voltage is less than 60 V is defined as the low voltage. On the other hand, a voltage exceeding the same, i.e., a voltage such that the upper limit voltage of the DC voltage is 60 V or more, is defined as a high voltage. The DC voltage of less than 60 V in this specification indicates a voltage value in a substantial meaning. More specifically, it is considered that, when a substantial DC voltage value to be output is less than 60 V even in a case where 60 V is momentarily exceeded due to a noise, the electrical properties of the cell, and the like, influence on a human body is substantially negligible, and therefore the DC voltage value may be regarded as the low voltage. However, it may be defined further considering safety that the upper limit voltage including a noise and the like is less than 60 V. Moreover, when influence on a human body is substantially negligible even when a person directly contacts the same, the predetermined voltage may be set to 61 V, for example.

As described above, the upper limit value of the DC voltage which can be output is set to the low voltage of less than 60 V in the fuel cell 1. In other words, the number of laminations of the cells possessed by the fuel cell 1 is set so that the upper limit value of the output voltage is less than 60 V. Thus, the fuel cell 1 can be disposed in the rear portion of the vehicle without requiring the protective measures for preventing the high voltage component from being exposed in collision and the like. More specifically, by setting the DC voltage which can be output of the fuel cell 1 to be less than 60 V, the fuel cell 1 can be disposed in a vehicle rear portion including a so-called crushable zone without requiring the protective measures described above.

The crushable zone is a portion provided at least in the rear portion of the car body 101 and is a portion configured to absorb collision energy in collision while being crushed to thereby reduce impact to a passenger compartment provided in a substantially center portion of the car body. The "vehicle rear portion" in this specification includes the crushable zone and is defined as any one of the following items (1) to (3). More specifically, the "vehicle rear portion" in this specification is any one of (1) Rear relative to the rear axle 6, (2) Back surface of a rear sheet, and (3) Baggage compartment in the rear of the rear sheet or under the floor of the baggage compartment (see a region enclosed with the alternate long and short dashed line of FIG. 2).

Figure 2:
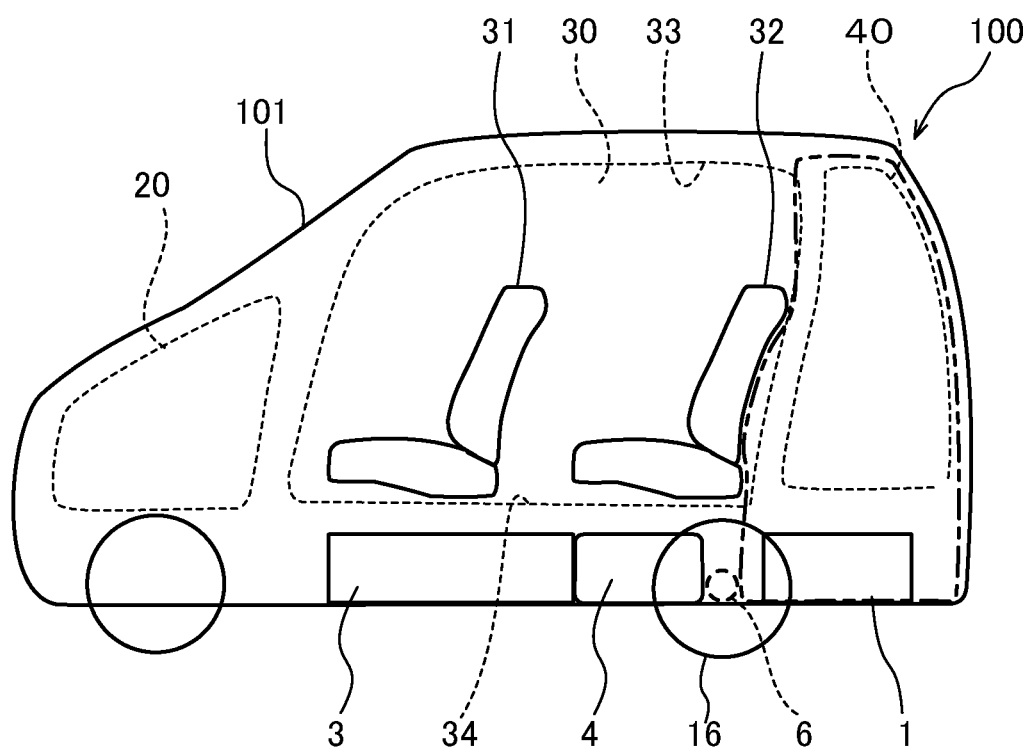
FIG. 2 is a schematic view in which the fuel cell vehicle of the first embodiment is viewed from the side surface of the car body.

FIG. 2 is a schematic block diagram for explaining the layout particularly in the height direction of configurations possessed by the fuel cell vehicle 100. The figure illustrates a side view of a principal portion in which the fuel cell vehicle 100 is viewed from the side surface of the car body.

The passenger compartment 30 is a portion configured to accommodate an occupant and is provided in the substantially center portion of the car body 101. The passenger compartment 30 is configured by a front sheet 31, a rear seat 32, a roof 33, a floor panel 34, and the like. The front sheet 31 and the rear seat 32 are arranged in the forward and backward direction and an occupant sits thereon. The roof 33 is the ceiling of the passenger compartment 30. The floor panel 34 configures the floor surface of the passenger compartment 30.

The baggage compartment 40 is a portion configured to house a baggage and provided in the rear portion of the car body 101. However, the baggage compartment 40 may be a space capable of housing a baggage provided in the rear portion of the rear seat 32 inside the car body 101 and may be divided into the front and the rear with a partition or may be a space portion continuous to the passenger compartment 30. In a space of the baggage compartment 40 illustrated in the figure, a sheet on which an occupant can sit can be further provided.

As illustrated also in FIG. 2, the fuel cell 1 of this embodiment is disposed in the rear portion of the vehicle. More specifically, the fuel cell 1 is disposed in the rear relative to the rear axle 6. The fuel cell 1 is disposed under the floor of the baggage compartment. However, the arrangement of the fuel cell 1 of the present invention is not limited to the arrangement illustrated in FIG. 2 and the fuel cell 1 may be arranged in a region from the rear axle 6 to the vehicle rear end enclosed with the alternate long and short dashed line in the figure, i.e., the "vehicle rear portion". Therefore, the fuel cell 1 may be disposed on the back surface of the rear seat 32 or may be disposed in the baggage compartment 40 in the rear of the rear seat 32 as defined as above relating to the "vehicle rear portion".

Since the upper limit value of the DC voltage which can be output is set to be less than 60 V, the fuel cell 1 can be disposed in the vehicle rear portion without requiring the structural protective measures considering collision safety and the like. Therefore, the fuel cell vehicle 100 to which the present invention is applied can carry the fuel cell 1 without narrowing the passenger compartment 30. In other words, by disposing the fuel cell 1 in the vehicle rear portion, the fuel cell vehicle 100 can carry the fuel cell 1 without raising the seating position of the rear seat 32 for securing a mounting space of the fuel cell 1. As a result, even when the fuel cell 1 is mounted, the distance between the floor panel 34 and the roof 33 is not narrowed, for example, and therefore the fuel cell vehicle 100 can carry the fuel cell 1 without narrowing the vertical direction of the passenger compartment 30.

Since the upper limit value of the output voltage of the fuel cell 1 is set to be the low voltage of less than 60 V, the number of stacks of the cells can be further reduced in the fuel cell 1 than in a high voltage fuel cell. Therefore, the fuel cell 1 can achieve a size reduction (thickness reduction) with the reduction in the number of stacks of the cells, and therefore the height of the fuel cell 1 under the floor of the baggage compartment 40 can be suppressed. Therefore, the fuel cell 1 can be prevented from compressing the space of the baggage compartment 40, so that a space in the vertical direction of the baggage compartment 40 can be more certainly secured.

As a result of disposing the fuel cell 1 in the vehicle rear portion, at least the fuel cell 1, the voltage converter 2, the battery 3, and the fuel tank 4 can be dispersively disposed at an equal height in the car body 101. Therefore, the center of gravity of the vehicle can be lowered, so that traveling stability can be increased.

As described above, the fuel cell 1 of this embodiment is disposed in the rear relative to the rear axle 6 as illustrated in FIGS. 1, 2. Thus, the fuel cell vehicle 100 can carry the fuel cell 1 without narrowing the passenger compartment 30 provided in the substantially center portion of the car body 101 while securing the safety in collision and the like.

The voltage converter 2 is disposed in a place in the front of the rear axle 6 as illustrated in FIG. 1 and at least other than the crushable zone in the car body 101. In the voltage converter 2, while an input side (primary side) has the low voltage of less than 60 V as described above, an output side (secondary side) to be boosted has a high voltage of 60 V or more in some cases. Therefore, in the voltage converter 2 of this embodiment, an insulation type DC/DC converter capable of securing the interception of the electric connection between the high voltage portion and the fuel cell 1 even in collision is preferably adopted considering the safety.

When the fuel cell 1 is realized by the SOFC, the temperature of the fuel cell 1 becomes a high temperature of about 700 to 900° C. in the operation. In this case, the voltage converter 2 is disposed at a position away from the fuel cell 1 through the rear axle 6, and therefore can avoid the receiving of heat from the fuel cell 1.

The ethanol stored in the fuel tank 4 is fuel which has high volatility and is easily flammable. The hydrogen gas is stored in a high pressure state. It is also not preferable that the fuel tank 4 in which such fuel is stored is arranged in the crushable zone from the viewpoint of the safety in collision. Therefore, the fuel tank 4 is disposed in the front of the rear axle 6 as illustrated in FIG. 1. Thus, a possibility that the fuel tank 4 is damaged in collision can be reduced. Even when the fuel cell 1 is realized by the SOFC, the fuel tank 4 is disposed at a position away from the fuel cell 1 through the rear axle 6 as described above, and therefore can avoid the receiving of heat from the fuel cell 1.

The voltage converter 2 and the fuel tank 4 of this embodiment are disposed in parallel in the forward and backward direction of the vehicle at positions in the front relative to the fuel cell 1 and in the rear relative to the battery 3. In other words, the voltage converter 2 and the fuel tank 4 are disposed to be arranged side by side in the width direction of the vehicle between the fuel cell 1 and the battery 3. As illustrated in the figure, the voltage converter 2 and the fuel cell 1 are connected by an electric wiring line 17. The fuel tank 4 and the fuel cell 1 are connected by fuel piping 18. The voltage converter 2 and the fuel tank 4 and the fuel cell 1 are disposed in the front and in the rear of the rear axle 6, respectively. Therefore, the electric wiring line 17 and the fuel piping 18 need to be made to pass through a narrow space between the rear axle 6 and the floor panel 34 of the vehicle. In this embodiment, by disposing the voltage converter 2 and the fuel tank 4 in parallel as described above, the electric wiring line 17 and the fuel piping 18 can be dispersively connected without crossing in the height direction of the car body 101. Therefore, the layout property of each wiring line near the rear axle 6 can be increased.

The rear axle 6 extending in the width direction of the vehicle is disposed in a region between the right and left rear wheels 16. Therefore, when another vehicle collides from the side of the vehicle, the deformation of the vehicle is suppressed as compared with the other portions because the vehicle is in a state where the width direction of the vehicle is reinforced with the rear axles 6. As described above, the fuel cell 1, the voltage converter 2, and the fuel tank 4 are disposed in the vicinity in the forward and backward direction of the rear axle 6 (see FIG. 1, FIG. 2). Therefore, the fuel cell 1, the voltage converter 2, and the fuel tank 4 are at least partially disposed in a region sandwiched between the rear wheels 16, whereby damages thereof due to collision from the width direction of the vehicle can be suppressed.

The battery 3 is disposed in the substantially center portion of the car body 101 and in the front relative to the voltage converter 2 and the fuel tank 4.

Figure 3:
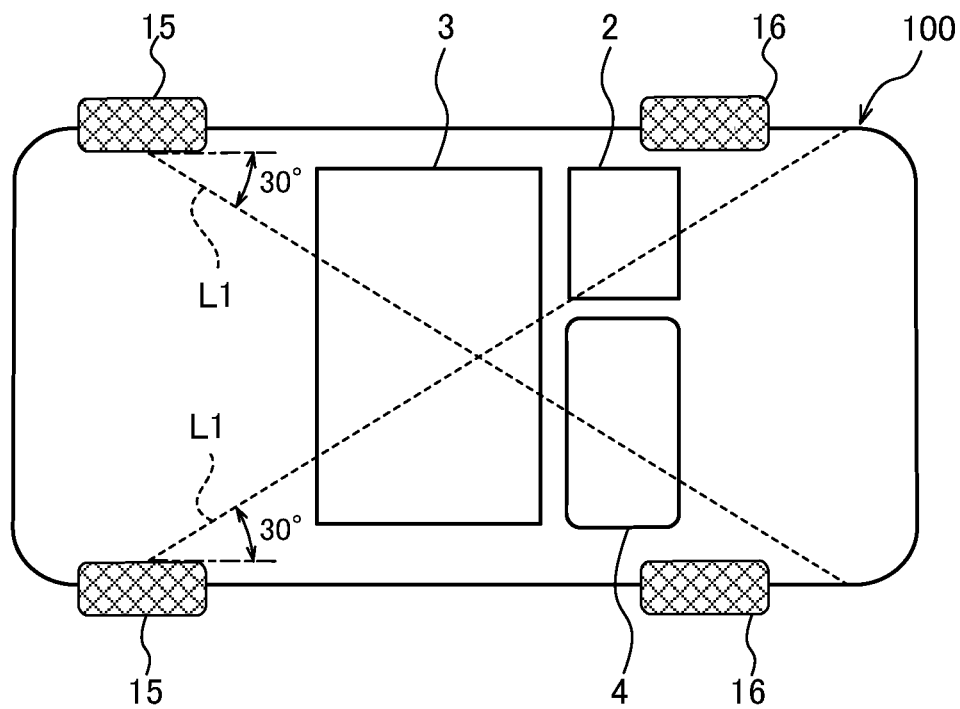
FIG. 3 are schematic views illustrating an example of the layout of a battery, a voltage converter, and a fuel tank.
Figure 3:
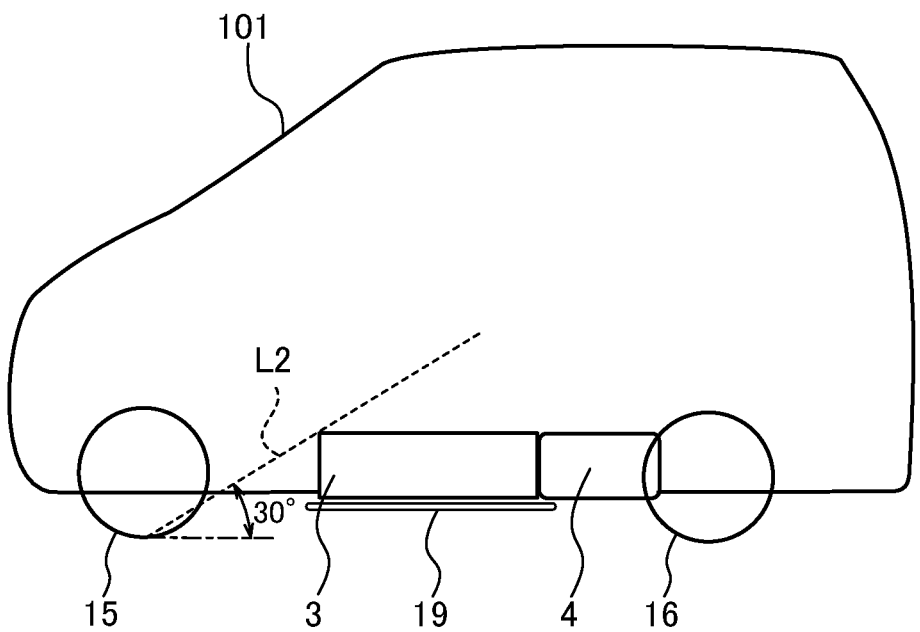

FIG. 3 are schematic views illustrating an example of the layout of the battery 3 and the voltage converter 2 and the fuel tank 4. FIG. 3(a) is a plan view in which the battery 3, the voltage converter 2, and the fuel tank 4 mounted in the fuel cell vehicle 100 are viewed from below the car body 101. FIG. 3(b) is a side view in which the battery 3 and the fuel tank 4 mounted in the fuel cell vehicle 100 are viewed from the side surface of the car body 101.

FIG. 3 illustrate an example in which the battery 3, the voltage converter 2, and the fuel tank 4 are disposed under the floor of the car body 101 (below a chassis). In usual, when the fuel tank 4 formed of resin or metal and particularly a connector portion of the voltage converter 2 are disposed under the floor, it is necessary to dispose a protective cover as measures against a flying stone (measures against chipping) from the front wheels 15 during traveling.

The chipping from the front wheels 15 is likely to occur mainly in the range sandwiched by the dotted lines in the figure. More specifically, when FIG. 3(a) is referred to, for example, the chipping from the front wheels 15 is likely to occur in the range between dashed lines L1 drawn while being shifted by about 30° in the width direction of the car body 101 with the center position between the right and left front wheels 15 as the reference from the side surfaces of the car body 101 and the side surfaces of the car body 101. When FIG. 3(b) is referred to, the chipping is likely to occur in the range between a dashed line L2 drawn while being shifted by about 30° in the height direction of the car body 101 with the grounding points of the front wheels 15 as the reference from the road surface and the road surface.

In this embodiment, a protective cover 19 is installed in a lower portion of the battery 3 as measures against the chipping from the front wheels 15 (see FIG. 3(b)). Meanwhile, no protective covers are installed in lower portions of the voltage converter 2 and the fuel tank 4. This is because the voltage converter 2 and the fuel tank 4 are disposed in the rear of the battery 3, and therefore the protective cover 19 installed in the lower portion of the battery 3 serves as a shield against the chipping from the front wheels 15, so that the chipping does not reach the voltage converter 2 and the fuel tank 4. More specifically, when the voltage converter 2 and the fuel tank 4 are disposed under the floor of the car body 101, the voltage converter 2 and the fuel tank 4 are disposed in the rear of the battery 3, whereby the installation of the protective cover in the lower portions of the voltage converter 2 and the fuel tank 4 can be avoided.

As described above, according to the fuel cell vehicle 100 of the first embodiment, in the fuel cell vehicle 100 provided with the motor 9 and configured to drive the motor 9 with power of at least one of the fuel cell 1 and the battery 3, the fuel cell 1 having a DC voltage of less than 60 V is disposed in the rear portion of the vehicle and the battery 3 is disposed in the front relative to the fuel cell 1. Thus, the fuel cell vehicle 100 can carry the fuel cell 1 without narrowing the passenger compartment 30 provided in the substantially center portion of the car body 101 by disposing the fuel cell 1 in the vehicle rear portion while securing the safety in collision and the like by setting the DC voltage which can be output of the fuel cell 1 to be less than 60 V.

Moreover, according to the fuel cell vehicle 100 of the first embodiment, the fuel tank 4 configured to store fuel supplied to the fuel cell 1 is disposed in the front relative to the fuel cell 1. More specifically, the fuel tank 4 is disposed in the front of the crushable zone where the fuel cell 1 is disposed, and therefore the fuel tank 4 is disposed in a region where the safety in collision is secured other than the crushable zone and the receiving of heat from the fuel cell 1 can also be avoided.

Moreover, according to the fuel cell vehicle 100 of the first embodiment, the voltage converter 2 configured to adjust the generated power of the fuel cell 1 is disposed in the front relative to the fuel cell 1. More specifically, the voltage converter 2 is disposed in the front of the crushable zone where the fuel cell 1 is disposed, and therefore the voltage converter 2 can be disposed in a region where the safety in collision is secured other than the crushable zone and the receiving of heat from the fuel cell 1 can also be avoided.

Moreover, according to the fuel cell vehicle 100 of the first embodiment, the fuel tank 4 is disposed at a position in the front relative to the fuel cell 1 and in the rear relative to the battery 3. Thus, simply by installing the protective cover 19 in the lower portion of the battery 3, the chipping to the fuel tank 4 can also be avoided by the protective cover 19. Therefore, the installation of the protective cover for the measures against the chipping can be avoided in the lower portion of the fuel tank 4.

Moreover, according to the fuel cell vehicle 100 of the first embodiment, the voltage converter 2 is disposed at the position in the front relative to the fuel cell 1 and in the rear relative to the battery 3. Thus, simply by installing the protective cover 19 in the lower portion of the battery 3, the chipping to the voltage converter 2 can also be avoided by the protective cover 19. Therefore, the installation of the protective cover for the measures against the chipping can be avoided. in the lower portion of the voltage converter 2.

Moreover, according to the fuel cell vehicle 100 of the first embodiment, the fuel tank 4 and the voltage converter 2 are disposed in parallel in the forward and backward direction of the vehicle at positions in the front relative to the fuel cell 1 and in the rear relative to the battery 3. Thus, the electric wiring line 17 and the fuel piping 18 can be dispersedly connected without crossing in the height direction of the car body 101. More specifically, the wiring can be performed while effectively utilizing a space in the width direction of the vehicle and securing a vertical space, and therefore the layout property of each wiring line near the rear axle 6 can be increased.

Second Embodiment

Figure 4:
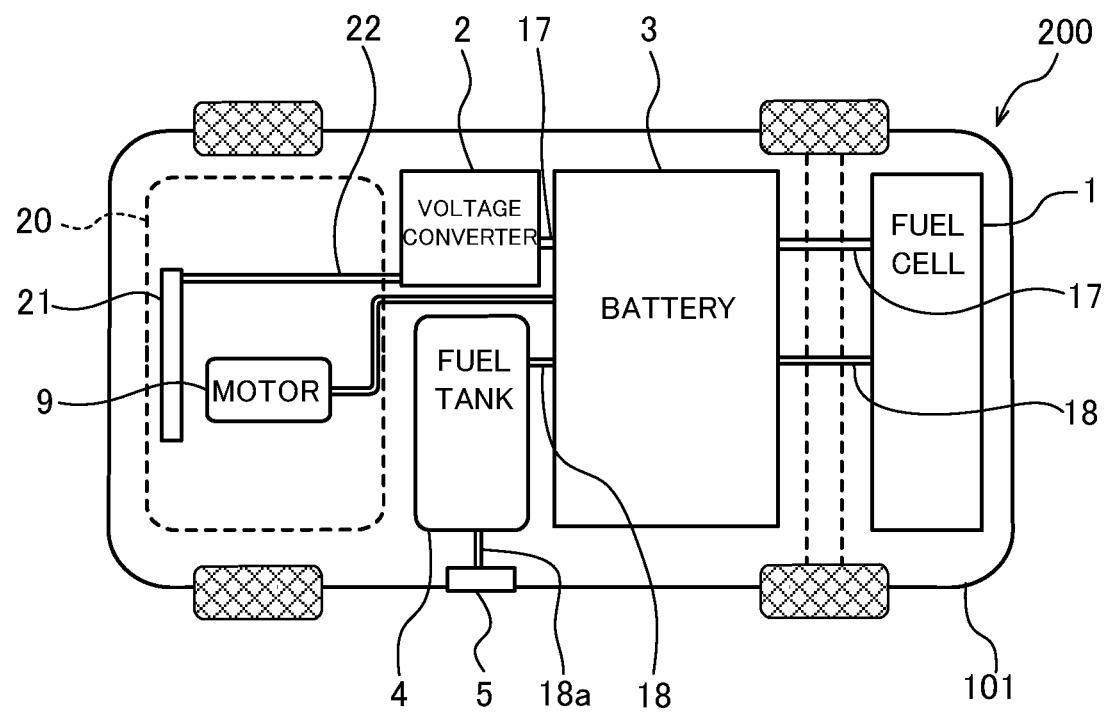
FIG. 4 is a schematic view in which a fuel cell vehicle of a second embodiment is viewed from the lower side of a car body.

FIG. 4 is a schematic block diagram for explaining the layout of configurations possessed by a fuel cell vehicle 200 of a second embodiment. The figure illustrates a perspective plan view in which the fuel cell vehicle 200 of the second embodiment is viewed from the lower side of a car body.

The fuel cell vehicle 200 is different from the fuel cell vehicle 100 of the first embodiment in the arrangement of the voltage converter 2, the battery 3, the fuel tank 4, and the oil filling port 5. Moreover, the fuel cell vehicle 200 is provided with a radiator 21 as a heat exchanger disposed in the motor room 20 and a cooling water passage 22 configured so that cooling water from the radiator 21 can circulate at least between the radiator 21 and the voltage converter 2. The cooling water passage 22 is configured by a pipe formed of metal, a hose formed of resin, or the like.

In the fuel cell vehicle 200, the voltage converter 2 is disposed in the front relative to the battery 3. Thus, the distance between the voltage converter 2 and the radiator 21 disposed in the front of the vehicle can be reduced as compared with the first embodiment in which the voltage converter 2 is disposed in the rear of the battery 3, and therefore the length of the cooling water passage 22 can be shortened. The degree of freedom of the layout of the electric wiring line 17 connecting the voltage converter 2 and the fuel cell 1 is higher than that of the cooling water passage 22. Therefore, the electric wiring line 17 may be wired on the lower side of the battery 3 or wired bypassing the side surface without being limited to the wiring on the battery 3 as illustrated in the figure and the layout is not particularly limited.

In the fuel cell vehicle 200, the fuel tank 4 is disposed in the front relative to the battery 3. The oil filling port 5 is disposed in the front relative to the center of the vehicle as illustrated in the figure. In this case, by disposing the fuel tank 4 in the front relative to the battery 3, the distance between the fuel tank 4 and the oil filling port 5 can be reduced as compared with the first embodiment, and therefore the length of fuel piping 18a connecting the fuel tank 4 and the oil filling port 5 can be shortened.

As described above, according to the fuel cell vehicle 200 of the second embodiment, the fuel tank 4 is disposed in the front relative to the battery 3. Thus, when the oil filling port 5 is disposed in the front relative to the center of the vehicle, the distance between the oil filling port 5 and the fuel tank 4 is reduced, and therefore the length of the fuel piping 18a connecting the fuel tank 4 and the oil filling port 5 can be shortened. The fuel piping 18a has a diameter larger than that of the fuel piping 18 between the fuel tank 4 and the fuel cell 1, and therefore it is preferable that the fuel piping 18a between the fuel tank 4 and the oil filling port 5 is shorter than the fuel piping 18.

When fuel is liquid, such as alcohol, it is necessary to lay out the fuel piping 18a considering a height difference between the oil filling port 5 and the fuel tank 4. More specifically, due to a reduction in the distance between the oil filling port 5 and the fuel tank 4, the height difference between the oil filling port 5 and the fuel tank 4 is easily secured. Therefore, the layout property of the fuel piping 18a between the oil filling port 5 and the fuel tank 4 can be increased.

When a protective cover for measures against chipping is installed in a lower portion of the fuel tank 4, the chipping to the battery 3 is avoided by the protective cover installed in the lower portion of the fuel tank 4. Therefore, the installation of the protective cover in the lower portion of the battery 3 can be avoided or the installation area can be reduced.

Moreover, according to the fuel cell vehicle 200 of the second embodiment, the voltage converter 2 is disposed in the front relative to the battery 3. Thus, the distance between the voltage converter 2 and the radiator 21 disposed in the front of the vehicle can be reduced, and therefore the length of the cooling water passage 22 can be shortened. Simply by installing the protective cover for the measures against the chipping in a lower portion of the voltage converter 2, the chipping to the battery 3 is avoided by the protective cover. Therefore, the installation of the protective cover in the lower portion of the battery 3 can be avoided or the installation area can be reduced.

Third Embodiment

Figure 5:
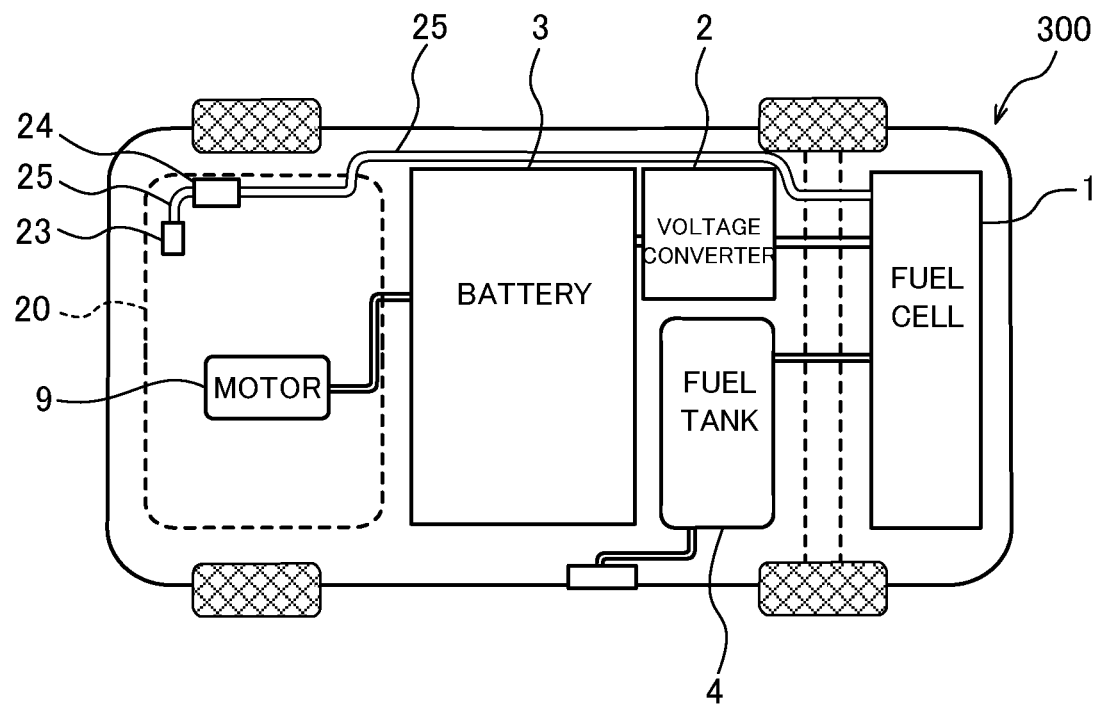
FIG. 5 is a schematic view in which a fuel cell vehicle of a third embodiment is viewed from the lower side of a car body.

FIG. 5 is a schematic block diagram for explaining the layout of configurations possessed by a fuel cell vehicle 300 of a third embodiment. The figure illustrates a plan view in which the fuel cell vehicle 300 of the third embodiment is viewed from the lower side of a car body.

The fuel cell vehicle 300 is provided with an inlet port 23, an air blower 24, and air piping 25 in addition to the configurations described in the fuel cell vehicle 100 of the first embodiment. Among the configurations, the air blower 24 at least is disposed in the motor room 20 located in the front of the vehicle.

The inlet port 23 is an intake of the air also referred to as an air intake. The inlet port 23 is disposed in a substantially front in the front of the vehicle and takes in at least the air to be supplied to the fuel cell. The inlet port 23 may be provided with an air filter configured to remove wastes and the like in the air. By disposing the air blower 24 in the motor room 20 and concomitantly disposing the inlet port 23 in the substantially front in the front of the vehicle, the air from the vehicle front can be efficiently taken in particularly during traveling of the vehicle.

The air blower 24 supplies the air (cathode gas) taken in from the inlet port 23 to the fuel cell 1 through the air piping 25. By disposing the air blower 24 particularly on the front side of the motor room 20, the distance between the air blower 24 and an occupant (passenger compartment 30, see FIG. 2) is increased as compared with a case where the air blower 24 is disposed in the center or a rear portion of the vehicle. Therefore, measures against noise and vibration resulting from the operation of the air blower 24 can be avoided or reduced.

Equipment, such as the motor 9 and an inverter, disposed in the motor room 20 generates heat during vehicle traveling. Therefore, by disposing the inlet port 23 in the front of the vehicle and disposing the air blower 24 in the motor room 20, the air blower 24 may supply part of the air taken in by the inlet port 23 also into the motor room 20. Thus, the equipment, such as the motor 9, disposed in the motor room 20 can also be cooled.

As described above, according to the fuel cell vehicle 300 of the third embodiment, the motor room 20 which is positioned in the front of the vehicle and in which the motor 9 is disposed is provided and the air blower 24 configured to supply the air to the fuel cell 1 is disposed in the motor room 20. Thus, the inlet port 23 accompanying the air blower 24 is also disposed in the front of the vehicle. Therefore, the air from the vehicle front can be efficiently taken in and the distance between the air blower 24 and the passenger compartment 30 is increased, and thus measures against noise and vibration resulting from the operation of the air blower 24 can be reduced.

As described above, the embodiments of the present invention and modifications thereof are described but the embodiments and the modifications merely illustrate some application examples of the present invention and do not intend to limit the technical scope of the present invention to the specific configurations of the embodiments described above. Moreover, the embodiments described above and the modifications thereof can be combined as appropriate.

For example, the arrangement in the width direction of the vehicle relating to the voltage converter 2 and the fuel tank 4 is not limited to the arrangement described using FIG. 1 and FIG. 4, for example. For example, when the oil filling port 5 is provided on the right side in the forward and backward direction of the vehicle, the fuel tank 4 may be disposed on the right side and the voltage converter 2 may be disposed on the left side.

The description above gives a description that the upper limit value of the DC voltage which can be output of the fuel cell 1 is less than 60 V. However, when the safety regulations in collision and the like are considered, the upper limit value may be changed as appropriate according to the upper limit voltage value in the regulations (see for example, National Agency for Automobile and Land Transport Technology Examination Business Regulations). The operation voltage according to the regulations is equivalent to the output voltage of the fuel cell 1.

The invention claimed is:

1. An electric vehicle, comprising:
a motor as a motive power source of the vehicle;
a battery having an output DC voltage that can drive the motor;
a fuel cell having an output DC voltage less than the output DC voltage of the battery;
a fuel tank that supplies fuel to the fuel cell; and
a DC/DC converter configured to boost the output DC voltage of the fuel cell such that the motor can be driven by an output power of at least one of the battery or the fuel cell
wherein
the fuel cell is entirely disposed in rear relative to a rear axle of the vehicle,
the battery is disposed in front relative to the fuel cell, and
the fuel tank and the DC/DC converter are disposed in front relative to the fuel cell and in rear relative to the battery.

2. The electric vehicle according to claim 1, wherein the fuel tank and the DC/DC converter are disposed in parallel in a forward and backward direction of the vehicle.

3. The electric vehicle according to claim 1, comprising:
a motor room which is positioned in front of the vehicle and in which the motor is disposed, wherein
an air blower configured to supply air to the fuel cell is disposed in the motor room.

4. The electric vehicle according to claim 1, wherein the DC/DC converter has an output side having a higher voltage than the fuel cell.

* * * * *